C. E. HOLLIDAY.
WHEEL CENTER.
APPLICATION FILED MAY 9, 1914.

1,289,461.

Patented Dec. 31, 1918.

Witnesses
A. O'Connor
W. E. Vack Jr.

Inventor
C. E. Holliday
By Richard B. Owen.
Attorney

UNITED STATES PATENT OFFICE.

CLARENCE E. HOLLIDAY, OF DUNCAN, NEBRASKA.

WHEEL-CENTER.

1,289,461.  Specification of Letters Patent.  Patented Dec. 31, 1918.

Application filed May 9, 1914. Serial No. 837,501.

*To all whom it may concern:*

Be it known that I, CLARENCE E. HOLLIDAY, citizen of the United States, residing at Duncan, in the county of Platte and State of Nebraska, have invented certain new and useful Improvements in Wheel-Centers, of which the following is a specification.

My invention relates to the central portion of the wheel; and it consists of a construction wherein the hub is resiliently sustained centrally within an encircling rim by suitable springs, the latter being locked against circumferential movement in a manner to be hereinafter fully described.

In describing my invention in detail reference will be had to the accompanying drawings wherein like characters denote like or corresponding parts throughout the several views, and in which:—

Figure 1:
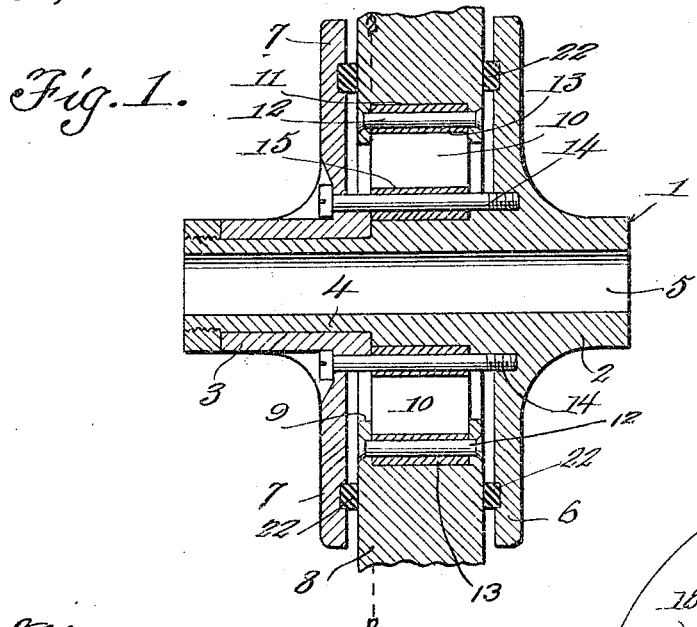
Figure 1 is a transverse sectional view of a wheel center illustrating the manner in which the springs are arranged.

Referring now to the drawings by numerals, 1 designates as an entirety, the hub, the same comprising hub sections designated respectively 2 and 3, the former being provided with an integral sleeve like extension 4 extending concentrically through the latter, the bore 5 of the extension providing for the reception of the wheel axle in a manner common to the art.

Between an annular extension 6 of the hub section 2, and a like extension 7 of the hub section 3, the wheel center designated as an entirety by the numeral 8 is arranged, said center 8 embracing the extension 4 of the section 2, the latter being maintained concentric to the opening 9 of the wheel center through the medium of a plurality of circular plate like springs 10, the springs being arranged in circumferential relation relatively to each other and disposed to fit in an annular groove 11 of the wheel center and in depressions 10ª, retaining pins 12 extending through sleeves 13 therefor brazed upon the respective springs. Bolts 14 also extend through sleeves 15 brazed to the interior surfaces of the springs 10, the sleeves 15 being arranged at diametrically opposite points relatively to the sleeves 13 and receiving the bolts 14 which extend through extension 7 of hub section 3 and into extension 6 of hub section 2, said bolts not only locking the springs immovable relatively to the wheel center 8 but also holding the two wheel hub sections immovable independently of each other.

Figure 2:
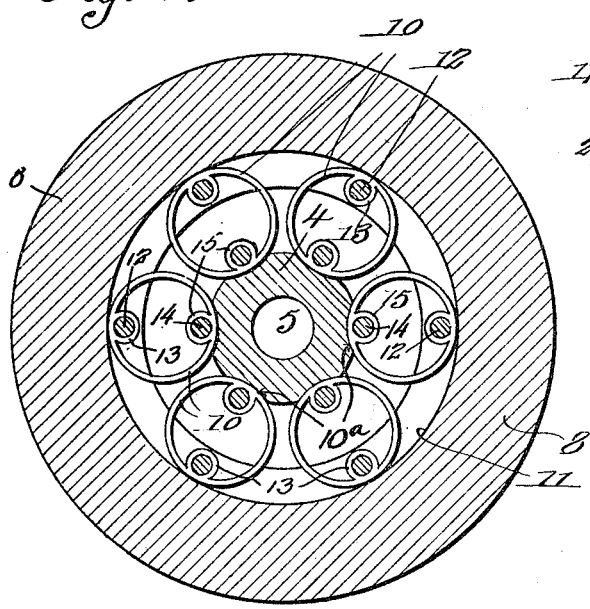
Fig. 2 is a cross section on the line 2—2 of Fig. 1.
Figure 3:
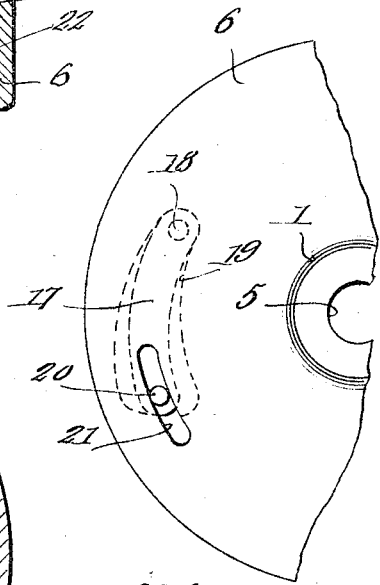
Fig. 3 is a fragmentary side elevation of one of the wheel hub sections illustrating the means employed to brace the wheel center against circumferential movement.

By the above arrangement, particularly upon reference to Fig. 2, it is apparent that the wheel center 8 is resiliently supported in a manner whereby the use of pneumatic tires may be dispensed with.

As a means whereby the springs 10 are relieved of circumferential strain brought to bear thereupon, I provide an oscillating arm 17 pivoted as at 18 in a recess 19 therefor of the wheel center 8, said arm carrying at its free end a pin 20 operating within a circumferentially extending slot 21 of said section 2, the engagement between the pin and slot terminals limiting circumferential movement of the wheel center relatively to the hub in the use of the device upon trucks wherein it is necessary to haul exceedingly heavy loads.

From the foregoing, taken in connection with the accompanying drawings it is apparent that the springs 10 are limited in their circumferential movement, not only by bolts 12 and 14, but in the event of excessive strain, by the engagement of the pin 20 with the terminals of the slot 21; that the wheel center is resiliently supported between the extensions 6 and 7 of the respective hub sections, any suitable means such as is indicated at 22 serving as a dust guard to prevent admission of dust and the like into the space confining the springs 10; and that a wheel with a center constructed as above set forth may be manufactured and placed upon the market at a minimum cost. The dust guards 22 are preferably made in the form of annular members which are adapted to be seated in annular recesses formed upon the inner faces of the flanges 6 and 7, and adapted to bear against the smooth outer surface of the wheel section, thereby permitting the wheel section to rotate with respect to the hub section without displacement of the guards.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

Having thus fully described my invention, what I claim as new and desire to secure by Letters Patent, is:—

A hub, comprising complemental sections, each formed with an outer annular extension, and one of the sections having a sleeve extension passing through the other section, cylindrical spring members disposed about the sleeve extension and in contact therewith and having interiorly disposed inner and outer sleeves at diametrically opposite points, bolts connecting the hub sections and passing through the inner sleeves of the cylindrical spring members, a wheel member arranged between the annular extensions of the hub sections and interiorly grooved to receive the outer portions of the cylindrical spring members, bolts passing through the inner extensions of the wheel member at the sides of the inner groove thereof and through the outer sleeves of the cylindrical spring members, and means between the hub and wheel members to limit their relative circumferential movement.

In testimony whereof I affix my signature in presence of two witnesses.

CLARENCE E. HOLLIDAY.

Witnesses:
    FRANK H. THOMAS,
    F. B. CYPHERS.

Copies of this patent may be obtained for five cents each, by addressing the "Commissioner of Patents, Washington, D. C."